United States Patent [19]

Itoh et al.

[11] Patent Number: 5,523,533
[45] Date of Patent: Jun. 4, 1996

[54] DEVELOPING DEVICE WHICH RESTRICTS CARRIER USING DEVELOPING AGENT REGULATING ROTARY MEMBER

[75] Inventors: Isami Itoh, Kawasaki; Tatsuya Tada, Yokohama, both of Japan

[73] Assignee: Canon Kabushiki Kaisha, Tokyo, Japan

[21] Appl. No.: 250,682

[22] Filed: May 26, 1994

[30] Foreign Application Priority Data

| May 28, 1993 | [JP] | Japan | 5-151092 |
| Nov. 29, 1993 | [JP] | Japan | 5-323163 |
| Apr. 28, 1994 | [JP] | Japan | 6-113674 |

[51] Int. Cl.$^6$ ............................ G03G 15/09
[52] U.S. Cl. ............................ 118/658; 355/253
[58] Field of Search ............ 355/251, 252, 355/253; 118/657, 658

[56] References Cited

U.S. PATENT DOCUMENTS

| 2,221,776 | 11/1940 | Carlson. | |
| 2,297,691 | 10/1942 | Carlson. | |
| 2,874,063 | 2/1959 | Greig. | |
| 3,909,258 | 9/1975 | Kotz. | |
| 4,464,041 | 8/1984 | Haneda et al. | 355/253 |
| 4,624,559 | 11/1986 | Haneda et al. | 355/253 |
| 4,637,706 | 1/1987 | Hosoi et al. | 118/658 |
| 4,660,958 | 4/1987 | Egami et al. | 118/658 |
| 4,705,383 | 11/1987 | Hiraga et al. | 355/253 |
| 4,777,512 | 10/1988 | Takahashi et al. . | |
| 4,985,823 | 1/1991 | Tada et al. . | |
| 5,054,419 | 10/1991 | Itaya et al. | 118/657 |
| 5,072,690 | 12/1991 | Ishikawa et al. | 118/658 |
| 5,239,343 | 8/1993 | Sakemi et al. | 355/253 |

FOREIGN PATENT DOCUMENTS

| 4324748 | 10/1943 | Japan . | |
| 52-94140 | 8/1977 | Japan . | |
| 54-43036 | 4/1979 | Japan . | |
| 55-50274 | 4/1980 | Japan . | |
| 0030861 | 2/1982 | Japan | 355/253 |
| 0140778 | 5/1982 | Japan | 355/253 |
| 0154269 | 9/1982 | Japan | 355/253 |
| 58-90668 | 5/1983 | Japan . | |
| 58-143360 | 8/1983 | Japan . | |
| 0231276 | 10/1987 | Japan | 355/253 |
| 0165339 | 7/1993 | Japan | 355/253 |

*Primary Examiner*—Robert Beatty
*Attorney, Agent, or Firm*—Fitzpatrick, Cella, Harper & Scinto

[57] ABSTRACT

A developing device including a developing agent container for storing a developing agent composed of toner particles and magnetic carrier particles, a toner carrier for carrying and conveying the toner particles to supply the toner particles to an image carrier for carrying an electrostatic image, and a developing agent regulating rotary member, disposed adjacent the toner carrier with a gap therebetween, for forming a brush of the magnetic carrier particles by a magnetic force between itself and the toner carrier. The regulating rotary member allows only the toner to pass therethrough without substantially allowing passage of the carrier.

6 Claims, 6 Drawing Sheets

DEVELOPING DEVICE WHICH RESTRICTS CARRIER USING DEVELOPING AGENT REGULATING ROTARY MEMBER

BACKGROUND OF THE INVENTION

1. Field of the Invention

The present invention relates to a developing device used in an electrophotography or electrostatic recording type image forming apparatus such as a laser printer, a copying machine, or the like.

2. Related Background Art

As conventional electrophotography methods, many methods are known, as described in U.S. Pat. No. 2,297,691, Japanese Patent Publication Nos. 42-23910 and 43-24748, and the like. In general, an electric latent image is formed on a photosensitive member consisting of a photoconductive material by various means, and the latent image is visualized using a toner. The toner image is transferred onto a transfer member such as a paper sheet, as needed, and thereafter, the transferred toner image is fixed by heating, solvent vapor, or the like, thus obtaining a copy. Also, various methods of visualizing an electrostatic latent image using a toner are known.

As developing methods, a large number of developing methods, for example, a magnetic brush developing method described in U.S. Pat. No. 2,874,063, a powder cloud method and a fur brush developing method described in U.S. Pat. No. 2,221,776, a liquid developing method, and the like, are known.

Of these developing methods, in particular, a magnetic brush method, a cascade method, a liquid developing method, and the like, which use a developing agent consisting of a toner and carrier as major components, have been widely used in practical applications. These methods are excellent methods since a good image can be relatively stably obtained. However, they suffer from common drawbacks associated with a two-component developing agent, i.e., deterioration of the carrier, and a variation in mixing ratio of a portion A of the toner and carrier.

In order to avoid such drawbacks, various developing methods which use a one-component developing agent consisting of only a toner have been proposed. For example, U.S. Pat. No. 3,909,258 proposes a method of developing an image using a magnetic toner having conductivity. This method develops an electrostatic latent image by bringing it into contact with a conductive magnetic toner supported on a cylindrical conductive sleeve having a magnetic field formed therein. In this case, a conductive path is formed by toner particles on a developing region between the surface of a recording member and the surface of the sleeve, electric charges are guided from the sleeve to the toner particles via the conductive path, and the toner particles become attached to an electrostatic image portion by a coulomb force between themselves and the image portion, thereby developing the image. The developing method using the conductive magnetic toner is an excellent method since it can avoid conventional problems associated with a two-component toner. However, since toner has conductivity, it is difficult to electrostatically transfer a developed image to a final support member such as a normal paper sheet.

In order to solve this problem, as a developing method using a high-resistance toner, which can be electrostatically transferred, Japanese Laid-Open Patent Application No. 52-94140 discloses a developing method utilizing dielectric polarization of toner particles. However, this method essentially suffers from drawbacks such as low developing speed, insufficient density of the developed image, and the like, and it is difficult to use this method in practice. As another method using a high-resistance toner, a method of triboelectrically charging toner particles by friction between toner particles, friction between toner particles and a sleeve, and bringing the charged toner particles into contact with an electrostatic holding member to develop an image is known. However, these methods suffer from the following drawbacks. That is, the number of times of contact between the toner particles and the friction member is small, and triboelectric charging tends to be insufficient, or when the coulomb force between the charged toner particles and the sleeve is strong, the toner particles tend to agglomerate. For these reasons, many practical difficulties arise.

In contrast to this, Japanese Laid-Open Patent Application No. 54-43036 proposes a novel developing method which eliminates the above-mentioned drawbacks. In this method, a very thin toner layer is coated on a developing sleeve, and is triboelectrically charged. Then, the charged toner layer is brought very close to an electrostatic image to face the image without contacting it under application of a magnetic field, thereby developing the image.

According to this method, since a very thin magnetic toner layer is coated on the developing sleeve, the number of contact chances between the magnetic toner and the developing sleeve increases, and a triboelectrically charged electric charge amount required for development can be given to the toner.

In the developing method using a magnetic toner, as described in, e.g., Japanese Laid-Open Patent Application No. 54-43036, the thickness of a toner layer on the developing sleeve can be regulated to a predetermined toner layer thickness by a magnetic field formed between the developing sleeve and a magnetic doctor blade which is arranged to face an internal magnet of the developing sleeve.

However, the above-mentioned one-component system developing methods using the magnetic toner suffer from some drawbacks. For example, the fixing characteristics upon thermal fixing of a toner image transferred onto a transfer sheet are poor, and it is impossible to use color toners since the toner itself contains a magnetic member.

Contrary to this, as one-component developing methods using a non-magnetic toner, a powder cloud method, an impression developing method, and the like are known. Of these methods, a fur brush developing method for developing an image with a developing agent attached to a cylindrical brush formed using a soft fur of, e.g., a beaver, an impression developing method using a developing agent attached to, e.g., a velvet roller, and the like are well known. These developing methods do not use a toner, to which a magnetic substance is internally added, upon development of an electrostatic latent image, and does not require any complex device for maintaining a constant ratio between toner and carrier particles.

However, the developing method using a non-magnetic toner cannot obtain a predetermined uniform toner layer even when the same magnetic blade as that in Japanese Laid-Open Patent Application No. 54-43036 is used. For this reason, a nonuniform toner layer is coated on the surface of the developing sleeve, and this appears as image density nonuniformity. When an elastic blade is used as the doctor blade, the toner layer thickness can be regulated. In this case, the latitude of a pressing pressure of the elastic blade against the developing sleeve is very narrow. For this reason, when the pressing pressure is too low, a predetermined uniform toner layer thickness cannot be obtained; when it is too high, the toner and the developing sleeve are damaged.

In order to solve the above-mentioned drawbacks, developing methods described in, e.g., Japanese Patent Publication Nos. 58-90668, 58-143360, and the like are known.

FIG. 5 shows an example of a developing device for practicing such a developing method. Referring to FIG. 5, a developing device 20 comprises a toner container 3 for storing a non-magnetic toner 11 and magnetic particles 10, a developing sleeve 1a which consists of a non-magnetic member, faces a photosensitive drum 15 as a latent image carrier, and is arranged at the opening portion of the toner container 3, a permanent magnet 1b fixed in the developing sleeve 1a, and a magnetic member blade 2 which is fixed to the toner container 3, and regulates the thickness of a toner layer which is supported and conveyed toward the photosensitive drum 15. Note that the interval or gap between the magnetic member blade 2 and the developing sleeve 1a is set to be 250 µm.

In the developing device 20 with the above-mentioned arrangement, the magnetic particles 10 form a brush 10a along a magnetic field between the magnetic member blade 2 and the permanent magnet 1b, and are restricted in the magnetic field. The non-magnetic toner 11 moves while being dragged by the developing sleeve 1a having a roughened surface, is simultaneously charged by friction between the magnetic particles and the developing sleeve 1a, and becomes attached to the magnetic particles and the developing sleeve 1a due to a reflection force. However, since the magnetic particles cannot move due to restriction of the above-mentioned magnetic field, only non-magnetic toner particles attached to the developing sleeve 1a can pass through the brush formed by the magnetic particles, and a uniform non-magnetic toner layer is formed on the surface of the developing sleeve 1a upon rotation of the developing sleeve 1a.

In the above-mentioned conventional developing device, the magnetic particles must perform the functions of forming a magnetic brush in a system in which a large quantity of toner are present, coating the toner onto the developing sleeve, and regulating the coating amount of the toner. At the same time, the magnetic particles must perform the function of supplying the toner while cyclically moving, and it is not preferable for the magnetic particles to pass between the magnetic member blade and the developing sleeve. Therefore, in order to satisfy these functions, the magnetic particles must exhibit a proper circulation property while maintaining a proper restriction force generated by the magnetic field, and must form a magnetic brush which has a proper hardness and density to allow uniform coating.

For example, a relatively coarse brush tends to form a stripe indicative of insufficient regulation on the developing sleeve. On the other hand, a relatively dense brush tends to extremely decrease the thickness of the toner layer on the developing sleeve.

When the circulation property of the magnetic particles is too high, the thickness of the toner layer increases to cause fogging on an image, and the magnetic particles undesirably pass through the magnetic member blade. On the other hand, when the circulation property is poor, the magnetic particles cannot sufficiently charge the toner. For this reason, an image error called a ghost phenomenon tends to occur, i.e., the density of an image formed by the first revolution of the developing sleeve is high, but that of images formed by subsequent revolutions is low.

In other words, the latitude of a proper state of the brush which can satisfy the functions of the magnetic particles is very narrow.

Various developing methods which use a one-component developing agent consisting of only a toner have been proposed. For example, U.S. Pat. No. 3,909,258 proposes a method of developing an image using a magnetic toner having conductivity. This method develops an electrostatic latent image by bringing it into contact with a conductive magnetic developing agent supported on a cylindrical conductive sleeve having magnetism therein. In this case, a conductive path is formed by toner particles on a developing region between the surface of a recording member and the surface of the sleeve, electric charges are guided from the sleeve to the toner particles via the conductive path, and the toner particles become attached to an electrostatic image portion by a coulomb force between themselves and the image portion, thereby developing the image. The developing method using the conductive magnetic toner is an excellent method since it can avoid conventional problems associated with a two-component toner. However, since a toner has conductivity, it is difficult to electrostatically transfer a developed image to a final support member such as a normal paper sheet.

In order to solve this problem, as a developing method using a high-resistance toner, which can be electrostatically transferred, Japanese Laid-Open Patent Application No. 52-94140 discloses a developing method utilizing dielectric polarization of toner particles. However, this method essentially suffers from drawbacks such as low developing speed, an insufficient density of the developed image, and the like, and it is difficult to use this method in practice. As another method using a high-resistance toner, a method of triboelectrically charging toner particles by friction between toner particles, friction between toner particles and a sleeve, and bringing the charged toner particles to an electrostatic holding member to develop an image is known. However, these methods suffer from the following drawbacks. That is, the number of times of contact between the toner particles and the friction member is small, and triboelectric charging tends to be insufficient, or when the coulomb force between the charged toner particles and the sleeve is strong, the toner particles tend to agglomerate. For these reasons, many practical difficulties are pointed out.

In contrast to this, Japanese Laid-Open Patent Application No. 54-43036 proposes a novel developing method which eliminates the above-mentioned drawbacks. In this method, a very thin toner layer is coated on a developing sleeve, and is triboelectrically charged. Then, the charged toner layer is brought very close to an electrostatic image to face the image without contacting it under application of a magnetic field, thereby developing the image.

According to this method, since a very thin magnetic toner layer is coated, the number of contact chances between the magnetic toner and the developing sleeve increases, and a triboelectrically charged electric charge amount required for development can be given to the toner.

The present inventors examined electric charge application of the one-component developing method, and found that toner particles behaved as follows in the electric charge application portion of the one-component developing method.

FIG. 6 shows an example of a developing device using the magnetic one-component toner.

Referring to FIG. 6, the developing device comprises a toner container 3 for storing a magnetic one-component toner, a developing sleeve 1a which consists of a non-magnetic member, and is arranged at the opening portion of the toner container 3 to be rotatable in the direction of an arrow in FIG. 6, a permanent magnet 1b fixed in the developing sleeve 1a, a magnetic blade 2, consisting of a magnetic member, for regulating the thickness of a toner layer, and a toner convey member 4 arranged in the toner container 3. Note that the magnetic blade 2 is arranged to be separated from the developing sleeve 1a by a predetermined distance W. In general, the distance W is often set to fall within a range of from 100 µm to 1 mm.

In the developing device shown in FIG. 6, a magnetic one-component toner thin layer is coated on the developing sleeve 1a. The thickness of the toner layer is determined by the position of a cut line L shown in FIG. 8.

As a result of our study, it was found that a magnetic toner T was charged when the magnetic toner T passed between the developing sleeve 1a and the magnetic blade 2. Also, it was found that the behavior of the magnetic toner at that time was as follows.

As shown in FIG. 7, planes perpendicular to a straight line connecting the developing sleeve 1a and the magnetic blade 2 are assumed, the plane closer to the magnetic blade 2 is represented by S1, and the plane closer to the developing sleeve 1a is represented by S2. The width of the magnetic blade 2 is normally set to be smaller than that of the permanent magnet 1b. In this case, upon examination of the magnetic flux densities on the planes S1 and S2, the magnetic flux density on the plane S1 is larger than that on the plane S2. Therefore, the magnetic toner T receives a force in the direction of an arrow in FIG. 7, i.e., a force toward the magnetic blade 2 side, between the developing sleeve 1a and the magnetic blade 2.

Therefore, as shown in FIG. 8, the magnetic toner particles T form ears (state B), and these ears are formed from the magnetic blade 2 in the direction of the developing sleeve 1a. In this case, the magnetic toner T is charged as follows. That is, when toner particles t1 at the distal ends of the ears formed from the magnetic blade 2 contact the developing sleeve 1a, an electric charge is applied to the distal ends of the ears.

It was also found that the toner was conveyed as follows between the developing sleeve 1a and the magnetic blade 2.

As described above, since an electric charge is applied to the toner particle t1 at the distal end of each ear contacting the developing sleeve 1a, a force in the direction of the developing sleeve 1a due to a reflection force acts, and a convey force in the rotational direction of the developing sleeve 1a is applied to the toner due to a frictional force with the developing sleeve 1a.

Since an agglomeration force acts between the toner particles to some extent, a convey force is also applied to a toner particle t2, which contacts the toner particle t1, via the agglomeration force. Furthermore, a convey force is similarly applied to a toner particle t3 in an upper layer portion via the agglomeration force.

However, a magnetic force in the direction of the magnetic blade 2 is applied to the toner between the developing sleeve 1a and the magnetic blade 2, as described above. Therefore, a portion A of the ear of toner is torn off at a position where the convey force acting on the toner overcomes the magnetic force, i.e., at the position of the cut line L shown in FIG. 8, and toner particles remaining on the developing sleeve 1a are conveyed in the rotational direction of the developing sleeve 1a.

Therefore, in a system having a high degree of agglomeration of a magnetic toner, a system which requires a large number of times of contact to obtain a necessary triboelectric charging electric charge amount, and the like, insufficiently charged toner particles which do not contact the developing sleeve are undesirably conveyed to a developing region, and a phenomenon caused by a charging error tends to occur.

SUMMARY OF THE INVENTION

It is an object of the present invention to provide a developing device which can restrict a magnetic carrier within a container.

It is another object of the present invention to provide a developing device which allows a large latitude in the state of a carrier brush which can restrict a carrier.

It is still another object of the present invention to provide a developing device comprising a developing agent container for storing a developing agent having a toner and a magnetic carrier, a toner carrier for carrying and conveying the toner so as to supply the toner to an image carrier for carrying an electrostatic image, and a developing agent regulating rotary member, arranged in the vicinity of the toner carrier, for forming a carrier brush by using a magnetic force formed between itself and the toner carrier, wherein the regulating rotary member allows only toner to pass therethrough without substantially allowing passage of the carrier.

Other objects of the present invention will become apparent from the following description.

DESCRIPTION OF THE PREFERRED EMBODIMENTS

An image forming apparatus according to the present invention will be described in detail below with reference to the accompanying drawings. In an embodiment to be described below, the present invention is embodied in, e.g., an electrophotography type image forming apparatus shown in FIG. 4, but is not limited to this.

Figure 4:
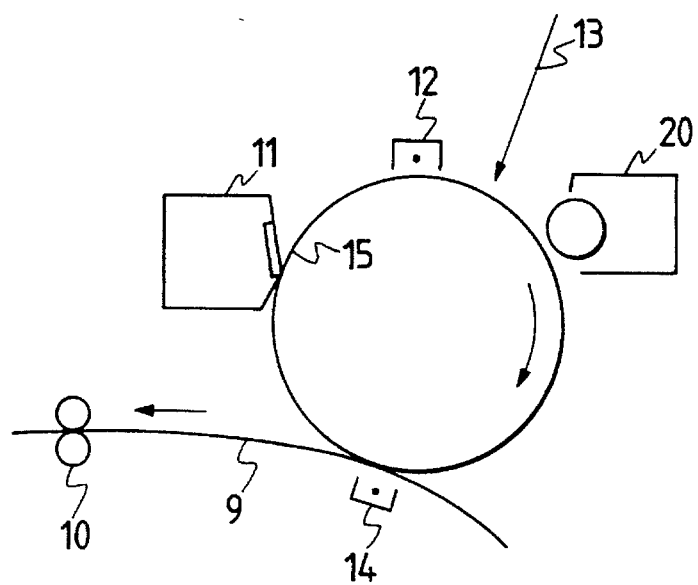
FIG. 4 is a schematic view showing the arrangement of an image forming apparatus which adopts the developing device according to each of the embodiments of the present invention.
Figure 5:
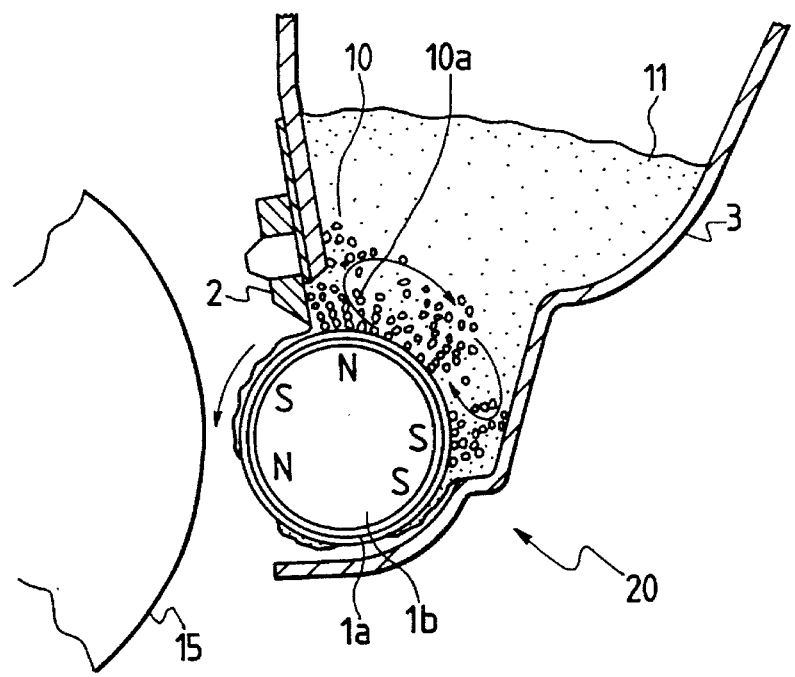
FIG. 5 is a sectional view of a conventional two-component developing device.
Figure 6:
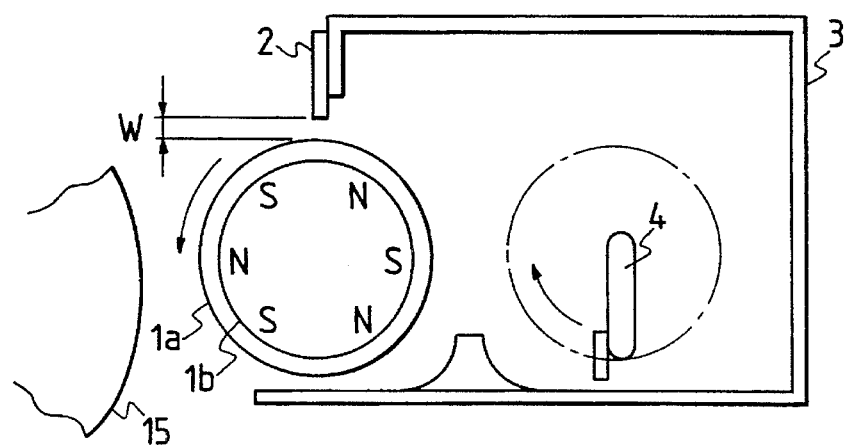
FIG. 6 is a sectional view of a conventional one-component developing device.
Figure 7:
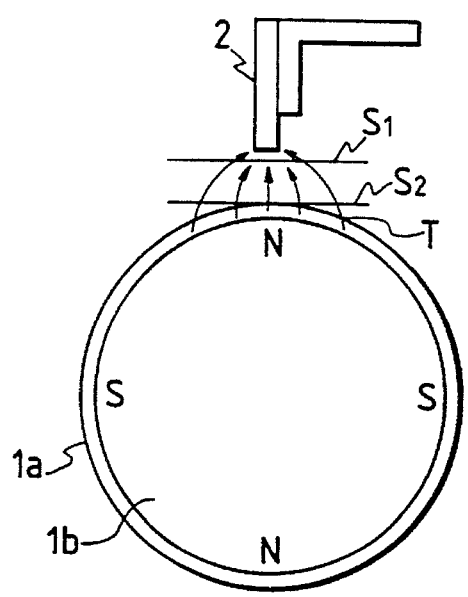
FIG. 7 is an explanatory view showing the movement of the lines of magnetic force of the developing device shown in FIG. 6.
Figure 8:
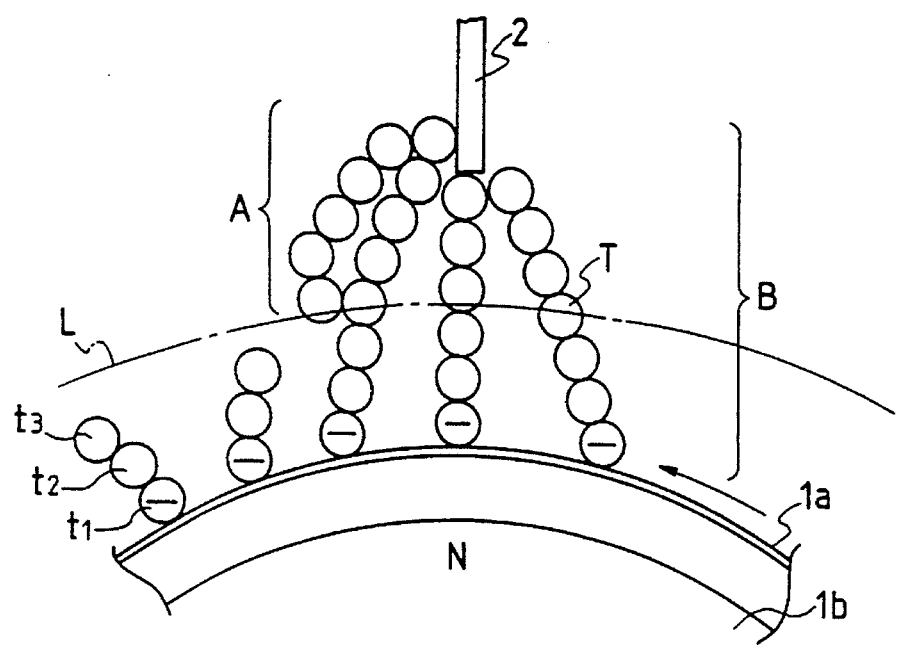
FIG. 8 is an explanatory view showing the behavior of a toner in a toner layer thickness regulating portion in the developing device shown in FIG. 6.

Referring to FIG. 4, in the electrophotography type image forming apparatus, a drum-shaped electrophotography photosensitive member (photosensitive drum) 15 which is constituted by forming a photoconductive layer on a conductive substrate is rotatably arranged as an electrostatic latent image carrier. The photosensitive drum 15 is uniformly charged by a charger 12. An information signal is exposed on the drum 15 using a light-emitting element 13 such as a laser to form an electrostatic latent image thereon, and the latent image is visualized by a developing device 20. Then, the visualized image is transferred onto a transfer paper sheet 9 by a transfer charger 14, and is fixed by a fixing device 10. The residual toner on the photosensitive drum 15 is cleaned by a cleaning device 11.

First Embodiment

The first embodiment of a developing device for the image forming apparatus according to the present invention will be described below with reference to FIG. 1. The developing device 20 comprises a developing sleeve 1a which consists of a non-magnetic member, faces the photosensitive drum 15 as a latent image carrier, and is arranged at the opening portion of a developing container 3 to serve as a toner carrier. A permanent magnet 1b is fixed in the developing sleeve 1a. The developing container 3 stores a developing agent containing a non-magnetic toner and magnetic particles, and incorporates a convey member 4 for conveying the developing agent therein in the direction of the developing sleeve 1a. A cylindrical toner layer thickness regulating member 6a consisting of a non-magnetic metal member is arranged in the very vicinity of the developing sleeve 1a. A permanent magnet 6b is inserted in the toner layer thickness regulating member 6a. The toner layer thickness regulating member 6a is rotatable in the same direction of an arrow b, the developing sleeve 1a is rotatable in the direction of an arrow a, and a distance W therebetween is set to be equal to or smaller than 1 mm.

Note that the permanent magnet 1b in the developing sleeve 1a has three each of N and S magnetic poles which are alternately arranged, and the permanent magnet 6b in the toner layer thickness regulating member 6a has one each of N and S magnetic poles. In this case, these permanent magnets are arranged, so that the opposing portions of the two magnets have different polarities, i.e., a magnetic pole $N_{11}$ of the permanent magnet 1b in the developing sleeve 1a faces a magnetic pole $S_{61}$ of the permanent magnet 6b in the toner layer thickness regulating member 6a, as shown in FIG. 1.

The sizes of the magnetic poles $N_{11}$ and $S_{61}$ are set so that the width of the magnetic pole $S_{61}$ is smaller than that of the magnetic pole $N_{11}$. The magnetic flux density of a magnetic field formed between the magnetic poles $S_{61}$ and $N_{11}$ thus changes so that it becomes higher from the developing sleeve 1a side toward the toner layer thickness regulating member 6a side.

Figure 1:
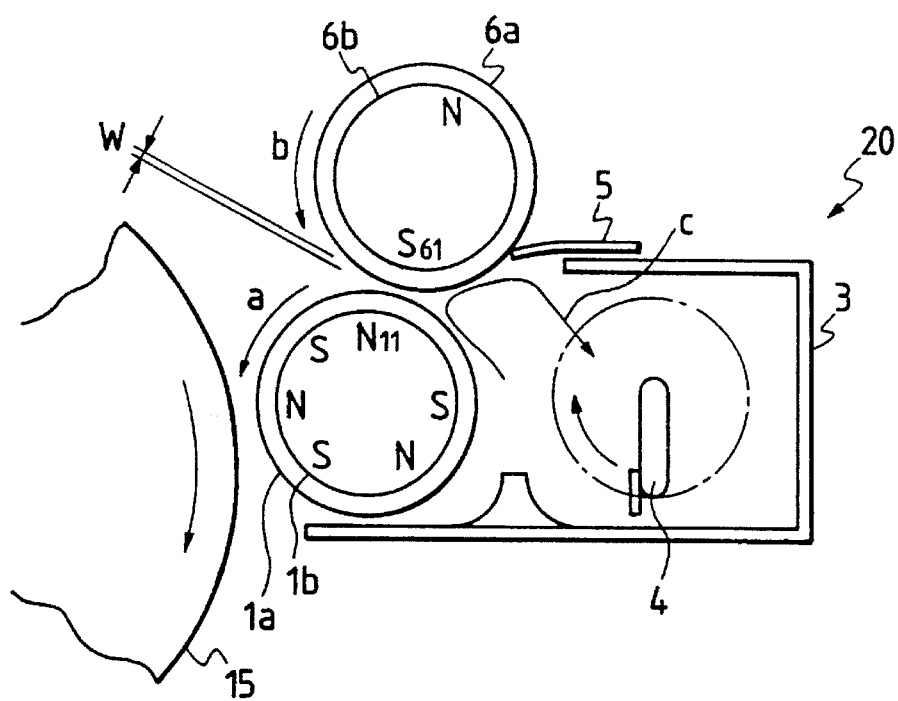
FIGS. 1 to 3 are sectional views of a developing device according to embodiments of the present invention.

In the developing device shown in FIG. 1, since the magnetic flux density becomes higher from the developing sleeve 1a side toward the toner layer thickness regulating member 6a side, a magnetic force from the developing sleeve 1a side toward the toner layer thickness regulating member 6a side acts on the magnetic particles present between the developing sleeve 1a and the toner layer thickness regulating member 6a. As a result, a brush of the magnetic particles is formed along the magnetic field between the magnetic poles $N_{11}$ and $S_{61}$.

Since the toner layer thickness regulating member 6a is rotated in the same direction of the arrow b in FIG. 1 as the rotational direction of the arrow a of the developing sleeve 1a, (i.e., counterclockwise), a convey force in the direction from the toner layer thickness regulating member 6a into the developing container 3 acts on the magnetic particles held on the surface of the toner layer thickness regulating member 6a by using the magnetic force due to the force of the magnetic field and a frictional force between the magnetic particles and the surface of the toner layer thickness regulating member 6a. Therefore, the magnetic particles will never be conveyed to a developing region beyond the facing position between the developing sleeve 1a and the toner layer thickness regulating member 6a.

The magnetic particles on the surface of the toner layer thickness regulating member 6a are scraped away by a scraper 5, one end of which is held by the developing container 3, and are returned into the developing container 3. The magnetic particles returned into the developing container 3 are stirred by the convey member 4 together with the non-magnetic toner particles, and are conveyed along the surface of the developing sleeve 1a to the facing position between the magnetic poles $N_{11}$ and $S_{61}$. More specifically, the circulation path in this case of the magnetic particles in the developing container 3 is as indicated by an arrow c in FIG. 1.

On the other hand, the non-magnetic toner particles are charged by friction between the magnetic particles and the developing sleeve 1a, become attached to the magnetic particles and the developing sleeve 1a by a reflection force, and are conveyed along the developing sleeve 1a. In this case, since the magnetic particles are returned from the facing position between the developing sleeve 1a and the toner layer thickness regulating member 6a into the developing container 3 for the above-mentioned reason, only sufficiently charged non-magnetic toner particles attached to the surface of the developing sleeve 1a can pass through the brush of the magnetic particles.

As can be seen from the above description, according to the developing device of this embodiment, a non-magnetic toner layer can be uniformly coated on the developing sleeve to have a desired thickness without applying an excessively high pressure which may damage the non-magnetic toner, the magnetic particles, and the developing sleeve, and the circulation function of the magnetic particles can be improved without leaking the magnetic particles to the developing region. For these reasons, the toner in the developing container can be sufficiently charged.

Second Embodiment

The second embodiment of a developing device for an image forming apparatus according to the present invention will be described below with reference to FIG. 2. Note that a description of the same portions as in the first embodiment will be omitted, and only different portions will be described in this embodiment.

In the developing device 20 of this embodiment, the scraper 5 (see FIG. 1) arranged in the developing device of the first embodiment is omitted, and a roller 7 and a belt member 8 looped between the roller 7 and the toner layer thickness regulating member 6a are arranged in the developing container 3. The belt member 8 is rotated in the direction of an arrow d (counterclockwise in FIG. 2) upon rotation of the toner layer thickness regulating member 6a which is rotated in the direction of the arrow b in FIG. 2.

In the developing device with the above-mentioned arrangement, magnetic particles which form a brush by using the magnetic field formed between the magnetic poles $N_{11}$ and $S_{61}$ are conveyed in the rotational direction indicated by the arrow d due to the frictional force between themselves and the belt member 8, and are returned into the developing container 3. The magnetic particles then drop due to their weights, and are stirred together with the other non-magnetic toner particles.

In the developing device with the above arrangement, the same effect as that in the first embodiment can be obtained.

Third Embodiment

The third embodiment of a developing device for an image forming apparatus according to the present invention will be described below with reference to FIG. 3. Note that a description of the same portions as in the first embodiment will be omitted, and only different portions will be described in this embodiment.

The feature of the developing device 20 of this embodiment resides in the arrangement of the magnetic poles of the permanent magnet 6b in the toner layer thickness regulating member 6a. More specifically, the permanent magnet 6b has two adjacent magnetic poles $S_{61}$ and $N_{61}$, the magnetic pole $S_{61}$ is arranged at a position facing the magnetic pole $N_{11}$ in the developing sleeve 1a, and the magnetic pole $N_{61}$ is arranged at a position substantially facing the scraper 5. The lines of magnetic force are connected between the magnetic poles $S_{61}$ and $N_{61}$, and a convey force in the direction of the developing container 3 acts on the magnetic particles between these poles.

In the developing device with the above-mentioned arrangement, the magnetic particles which form a brush by the magnetic force between the magnetic poles $N_{11}$ and $S_{61}$ receive the convey force due to the magnetic force between the magnetic poles $S_{61}$ and $N_{61}$ in addition to the magnetic force between the magnetic poles $N_{11}$ and $S_{61}$ and the frictional force between themselves end the surface of the toner layer thickness regulating member 6a, as in the first embodiment, and are conveyed into the developing container 3. The magnetic particles conveyed along the surface of the toner layer thickness regulating member 6a are scraped away from the toner layer thickness regulating member 6a into the developing container 3 by the scraper 5.

Fourth Embodiment

The arrangement of a developing device of this embodiment is the same as that shown in FIG. 1.

In the first embodiment, a non-magnetic toner is used, while in this embodiment, a magnetic toner is used.

In this embodiment, the magnetic flux density of the magnetic pole $S_{61}$ in the permanent magnet 6b, which was arranged at a position adjacent to and facing the magnetic pole $N_{11}$ in the permanent magnet 1b located at the facing position between the developing sleeve 1a and the toner layer thickness regulating member 6a, was set to be 800 Gs, and the magnetic flux density of the magnetic pole $N_{11}$ was set to be 900 Gs. In addition, the ratio between the widths of regions which exhibit values of 50% or more with respect to the peak values of the magnetic flux densities of the magnetic poles (to be referred to as 50% values hereinafter) was set to satisfy:

(50% value of magnetic pole $S_{61}$)/(50% value of magnetic pole $N_{11}$)≅0.8

The width of the magnetic pole $S_{61}$ was set to be smaller than that of the magnetic pole $N_{11}$, so that the magnetic flux density of a magnetic field formed between the magnetic poles $S_{61}$ and $N_{11}$ changed to become higher from the developing sleeve 1a side toward the toner layer thickness regulating member 6a side.

Furthermore, the distance W between the developing sleeve 1a and the toner layer thickness regulating member 6a was set to fall within a range from 100 μm to 2 mm, and the ratio between the absolute value of the peripheral velocity of the developing sleeve 1a and that of the toner layer thickness regulating member 6a was set to satisfy:

(Absolute value of peripheral velocity of toner layer thickness regulating member 6a)/(absolute value of peripheral velocity of developing sleeve 1a)>0.5

The weight-average particle size of the magnetic toner was set to be 5 μm or more, the weight of the magnetic substance internally added to the magnetic toner particles was set to be 10% or more of that of the magnetic toner particles, and a normal magnetic carrier having a weight-average particle size of 20 to 100 μm was used as the magnetic particles.

In the developing device with the arrangement shown in FIG. 1, since the magnetic flux density becomes higher from the developing sleeve 1a side toward the toner layer thickness regulating member 6a side, a magnetic force from the developing sleeve 1a side toward the toner layer thickness regulating member 6a side acts on the magnetic particles present between the developing sleeve 1a and the toner layer thickness regulating member 6a. As a result, a brush of the magnetic particles is formed along the magnetic field between the magnetic poles $N_{11}$ and $S_{61}$.

Since the toner layer thickness regulating member 6a is rotated in the same direction of the arrow b in FIG. 1 as the rotational direction of the developing sleeve 1a (counter-clockwise), a convey force in the direction from the toner layer thickness regulating member 6a into the developing container 3 acts on the magnetic particles held on the surface of the toner layer thickness regulating member 6a by using the magnetic force formed by the force of the magnetic field and a frictional force between the magnetic particles and the surface of the toner layer thickness regulating member 6a. Therefore, the magnetic particles will never be conveyed to a developing region beyond the facing position between the developing sleeve 1a and the toner layer thickness regulating member 6a.

The magnetic particles returned into the developing container 3 are scraped away from the surface of the toner layer thickness regulating member 6a by the scraper 5. The magnetic particles returned into the developing container 3 are stirred by the convey member 4 together with the toner particles, and are conveyed again along the surface of the developing sleeve 1a to the facing position between the magnetic poles $N_{11}$ and $S_{61}$. In this case, the circulation path of the magnetic particles in the developing container 3 is as indicated by the arrow c in FIG. 1.

The magnetic toner is charged by friction between the magnetic particles and the surface of the developing sleeve 1a in the developing container 3. The charged magnetic toner particles become attached to the surface of the developing sleeve 1a and the magnetic particles due to a reflection force by the electric charge of the toner itself, and are conveyed to the facing position between the developing sleeve 1a and the toner layer thickness regulating member 6a. When the developing agent is conveyed to the facing position, the magnetic particles are returned from the facing position between the developing sleeve 1a and the toner layer thickness regulating member 6a into the developing container 3 for the above-mentioned reason. Also, insufficiently charged magnetic toner particles, which are conveyed to the facing position due to, e.g., an agglomeration force, receive a magnetic force in the direction of the toner layer thickness regulating member 6a between the magnetic poles $N_{11}$ and $S_{61}$, and acquire a convey force in the rotational direction (the direction toward the interior of the developing container 3) of the toner layer thickness regulating member 6a due to the frictional force between themselves and the surface of the toner layer thickness regulating member 6a and the agglomeration force between the magnetic toner particles.

Therefore, the magnetic toner particles which pass the facing position, and are conveyed to the developing region include only sufficiently charged ones, which have acquired a reflection force with the developing sleeve 1a, which surpasses the convey force in the direction to the interior of the developing container 3.

More specifically, according to this arrangement, a magnetic toner layer can be uniformly coated on the developing sleeve to have a desired thickness without applying an excessively high pressure which may damage the toner, the magnetic particles, and the developing sleeve, and the magnetic toner can be sufficiently charged by mixing the magnetic particles and the magnetic toner particles. In addition, only sufficiently charged magnetic toner particles can be coated on the sleeve surface and can be conveyed to the developing region without leaking the magnetic particles to the developing region.

Fifth Embodiment

Figure 2:
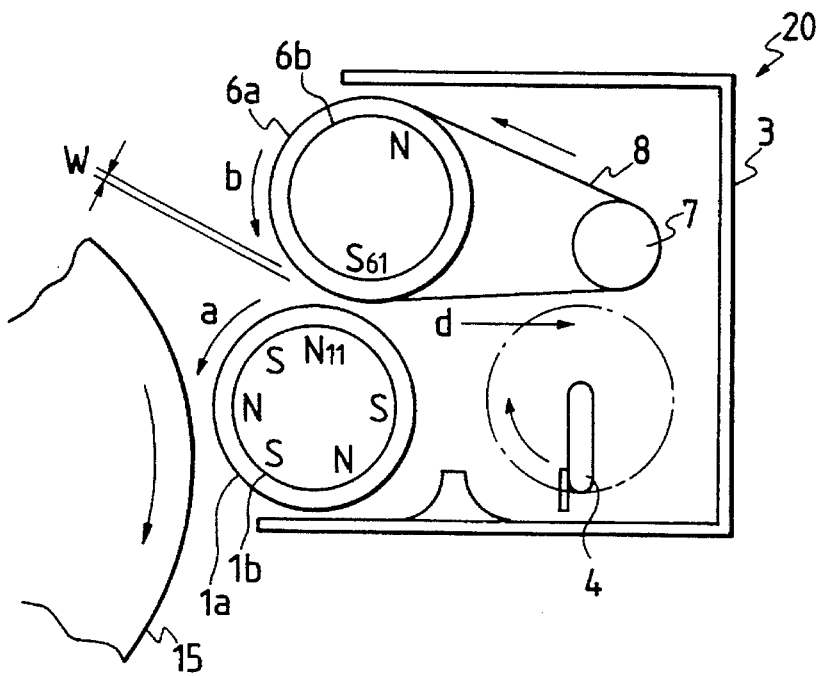

The arrangement of a developing device of this embodiment is the same as that shown in FIG. 2.

In this embodiment, a magnetic toner is used as in the fourth embodiment.

In this embodiment, the magnetic flux density of the magnetic pole $S_{61}$ in the permanent magnet $6b$, which is arranged at a position adjacent to and facing the magnetic pole $N_{11}$ in the permanent magnet $1b$ located at the facing position between the developing sleeve $1a$ and the toner layer thickness regulating member $6a$, was set to be 800 Gs, and the magnetic flux density of the magnetic pole $N_{11}$ was set to be 900 Gs. In addition, the ratio between the 50% values of the magnetic poles was set to satisfy:

(50% value of magnetic pole $S_{61}$)/(50% value of magnetic pole $N_{11}$)≅0.8

The width of the magnetic pole $S_{61}$ was set to be smaller than that of the magnetic pole $N_{11}$, so that the magnetic flux density of a magnetic field formed between the magnetic poles $S_{61}$ and $N_{11}$ changed to become higher from the developing sleeve $1a$ side toward the toner layer thickness regulating member $6a$ side.

Furthermore, the distance W between the developing sleeve $1a$ and the toner layer thickness regulating member $6a$ was set to fall within a range from 100 µm to 2 mm, and the ratio between the absolute value of the peripheral velocity of the developing sleeve $1a$ and that of the toner layer thickness regulating member $6a$ was set to satisfy:

(Absolute value of peripheral velocity of toner layer thickness regulating member $6a$)/(absolute value of peripheral velocity of developing sleeve $1a$)>0.5

The weight-average particle size of the magnetic toner was set to be 5 µm or more, the weight of the magnetic substance internally added to the magnetic toner particles was set to be 10% or more of that of the magnetic toner particles, and a normal magnetic carrier having a weight-average particle size of 20 to 100 µm was used as the magnetic particles.

In the developing device with the arrangement, as shown in FIG. 2, the magnetic particles which form a brush by using the magnetic field between the magnetic poles $N_{11}$ and $S_{61}$ are conveyed in the direction of the arrow d in FIG. 2 due to the frictional force between themselves and the belt member 8, are returned into the developing container 3, and drop into the developing container 3 by the force of gravity. As a result, the same effect as that of the developing device of the fourth embodiment could be obtained.

Sixth Embodiment

Figure 3:
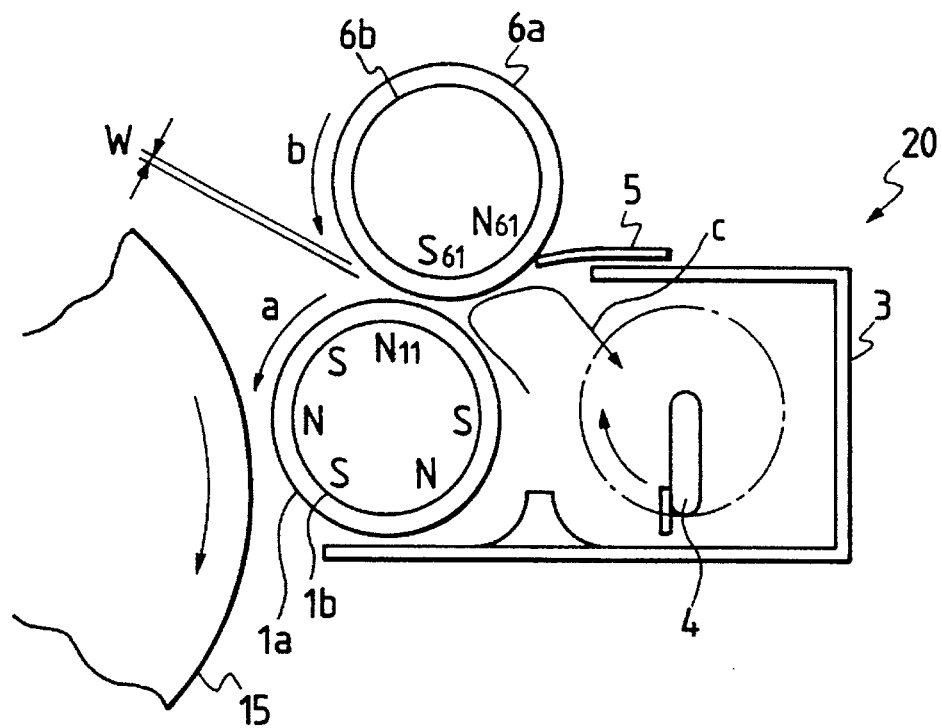

The arrangement of a developing device of this embodiment is the same as that shown in FIG. 3.

In this embodiment, a magnetic toner is used as well.

In this embodiment, the magnetic flux density of the magnetic pole $S_{61}$ in the permanent magnet $6b$, which was arranged at a position adjacent to and facing the magnetic pole $N_{11}$ in the permanent magnet $1b$ located at the facing position between the developing sleeve $1a$ and the toner layer thickness regulating member $6a$, was set to be 800 Gs, and the magnetic flux density of the magnetic pole $N_{11}$ was set to be 900 Gs. In addition, the ratio between the 50% values of the magnetic poles was set to satisfy:

(50% value of magnetic pole $S_{61}$)/(50% value of magnetic pole $N_{11}$)≅0.8

The width of the magnetic pole $S_{61}$ was set to be smaller than that of the magnetic pole $N_{11}$, so that the magnetic flux density of a magnetic field formed between the magnetic poles $S_{61}$ and $N_{11}$ changed to become higher from the developing sleeve $1a$ side toward the toner layer thickness regulating member $6a$ side. Furthermore, the distance W between the developing sleeve $1a$ and the toner layer thickness regulating member $6a$ was set to fall within a range from 100 µm to 2 mm, and the ratio between the absolute value of the peripheral velocity of the developing sleeve $1a$ and that of the toner layer thickness regulating member $6a$ was set to satisfy:

(Absolute value of peripheral velocity of toner layer thickness regulating member $6a$)/(absolute value of peripheral velocity of developing sleeve $1a$)>0.5

The weight-average particle size of the magnetic toner was set to be 5 µm or more, the weight of the magnetic substance internally added to the magnetic toner particles was set to be 10% or more of that of the magnetic toner particles, and a normal magnetic carrier having a weight-average particle size of 20 to 100 µm was used as the magnetic particles.

Also, in the developing device 20, the magnetic pole $N_{61}$ is arranged adjacent to the magnetic pole $S_{61}$ on the downstream side in the rotational direction of the toner layer thickness regulating member $6a$. Lines of magnetic force are connected between the magnetic poles $S_{61}$ and $N_{61}$, and a convey force in the direction toward the interior of the developing container acts on the magnetic particles between these two poles.

The magnetic particles which form a brush by using the magnetic field between the magnetic poles $N_{11}$ and $S_{61}$ receive the convey force due to the magnetic force between the magnetic poles $S_{61}$ and $N_{61}$ in addition to the magnetic force between the magnetic poles $N_{11}$ and $S_{61}$ and the frictional force between themselves and the surface of the toner layer thickness regulating member $6a$ as in the first embodiment, and are conveyed into the developing container 3. The magnetic particles conveyed along the surface of the toner layer thickness regulating member $6a$ are scraped away from the toner layer thickness regulating member $6a$ into the developing container 3 by the scraper 5.

As a result, the same effect as that in the developing device of the fourth embodiment could be obtained.

Seventh Embodiment

The seventh embodiment of a developing device for an image forming apparatus according to the present invention will be described below with reference to FIG. 9.

Figure 9:
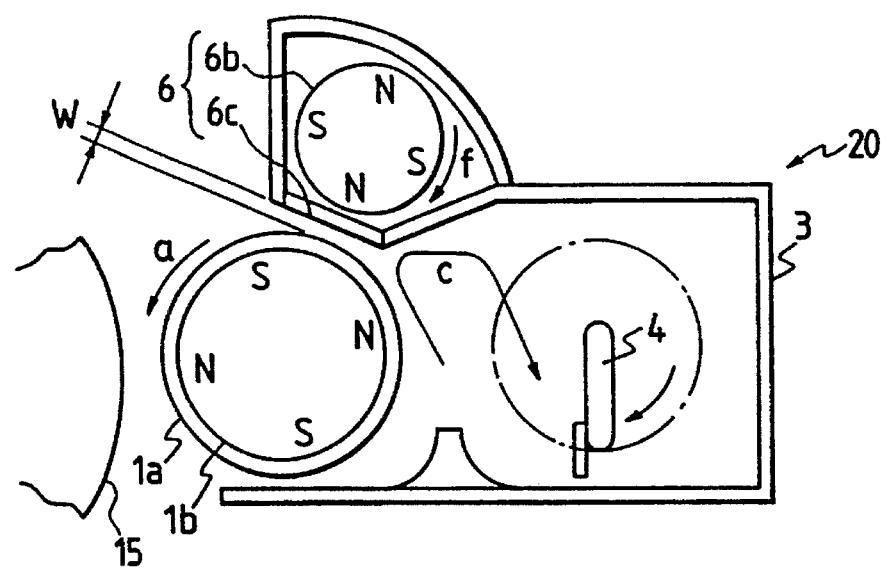
FIGS. 9 to 12 are sectional views of developing devices according to other embodiments of the present invention.

Referring to FIG. 9, a developing device 20 comprises a developing sleeve $1a$ as a developing agent carrier which faces a photosensitive drum 15 as a latent image carrier at the opening portion of a developing container 3, consists of a non-magnetic metal member, and is rotated in the direction of an arrow a in FIG. 9. A permanent magnet $1b$ having a plurality of magnetic poles is fixed in the developing sleeve $1a$. Also, a convey member 4 is arranged in the developing container 3 to be rotatable in the direction of an arrow in FIG. 9 so as to stir a developing agent, and to convey the developing agent in the direction of the developing sleeve 1a. Furthermore, a toner layer thickness regulating member 6 is arranged adjacent to the developing sleeve 1a to extend in the same direction as the extending direction of the sleeve 1a.

The toner layer thickness regulating member 6 is constituted by a rotatable permanent magnet 6b having at least two magnetic poles, and a non-magnetic member 6c arranged between the developing sleeve 1a and the permanent magnet 6b to isolate them from each other. The toner layer thickness regulating member 6 is arranged in the vicinity of a position between the magnetic poles of the permanent magnet 1b arranged in the developing sleeve 1a.

The toner layer thickness regulating member 6 is arranged in the vicinity of the developing sleeve 1a at the upstream side in the rotational direction of the developing sleeve 1a with respect to a developing region, and the permanent magnet 6b is rotatably arranged in the direction of an arrow f in FIG. 9, opposite to the rotational direction of the developing sleeve 1a.

According to this arrangement, a developing agent present between the toner layer thickness regulating member 6 and the developing sleeve 1a receives the same convey force as in the fourth embodiment from the permanent magnet 6b of the toner layer thickness regulating member 6 and the developing sleeve 1a.

In this embodiment, the permanent magnet 6b adopted a four-pole arrangement, the magnetic flux density of each magnetic pole was set to be 400 Gs or more, the 50% value of each magnetic pole was set to be 30° or more as an angle, a distance W between the developing sleeve 1a and the permanent magnet 6b was set to fall within a range from 500 µm to 2 mm, and the absolute value of the peripheral velocity of the permanent magnet 6b was set to be twice or more that of the developing sleeve 1a. The weight-average particle size of a magnetic toner particles was set to be 5 µm or more, the weight of a magnetic substance internally added to the magnetic toner was set to be 10% or more of that of the magnetic toner, and a normal magnetic carrier having a weight-average particle size of 20 to 100 µm was used as the magnetic particles. With the above-mentioned arrangement, it was confirmed that the same effect as in the fourth embodiment could be obtained.

In the developing device 20 of the embodiment shown in FIG. 1, magnetic particles must be scraped away from the surface of the toner layer thickness regulating member 6a by the scraper 5. As a result, if the load on the non-magnetic toner and magnetic particles is too strong upon scraping of the non-magnetic toner, it accelerates deterioration of the non-magnetic toner and the magnetic particles, and adhesion of the non-magnetic toner to the toner layer thickness regulating member 6a occurs over use for a long period of time.

A more preferred embodiment of the present invention, which does not require any scraper 5, will be described below.

Eighth Embodiment

The eighth embodiment of a developing device for an image forming apparatus according to the present invention will be described below with reference to FIG. 10.

Figure 10:
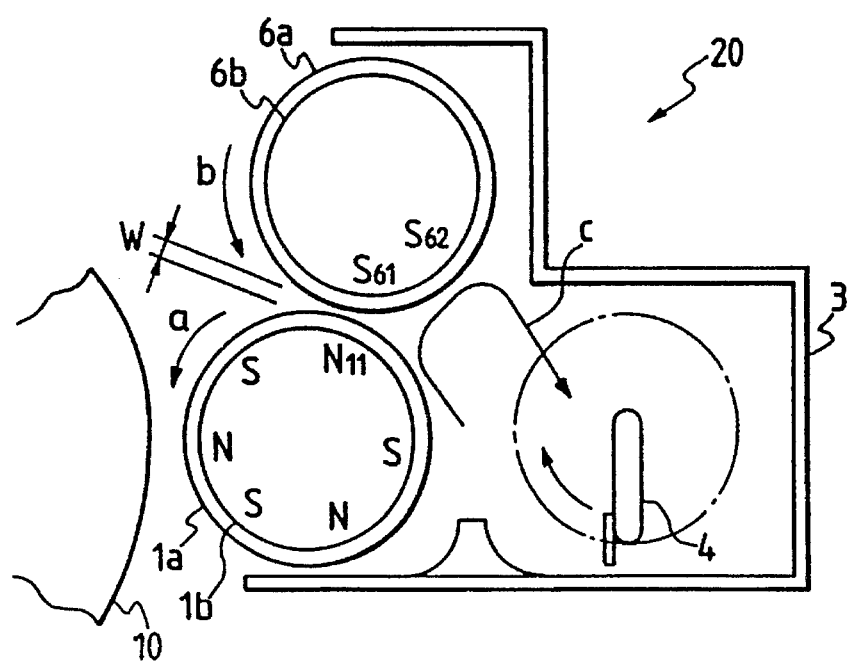

Referring to FIG. 10, a developing device 20 comprises a developing sleeve 1a as a toner carrier which faces a photosensitive drum 10 as an electrostatic latent image carrier, is arranged at the opening portion of a developing container 3 to be rotatable in the direction of an arrow a in FIG. 10, and consists of a non-magnetic metal member, and a permanent magnet 1b as first magnetic field generation means arranged in the developing sleeve 1a. The developing container 3 stores a magnetic toner, and a convey member 4 for conveying the magnetic toner in the direction of the developing sleeve 1a is arranged in the container 3. A cylindrical toner layer thickness regulating member 6a consisting of a non-magnetic metal member is arranged in the very vicinity of the developing sleeve 1a in the developing container 3, and a permanent magnet 6b as second magnetic field generation means is inserted in the toner layer thickness regulating member 6a. The toner layer thickness regulating member 6a is arranged at the upstream side, in the rotational direction of the developing sleeve 1a, of a developing region, and the rotational direction (arrow b) of the toner layer thickness regulating member 6a is the same as that (arrow a) of the developing sleeve 1a (counterclockwise).

Note that the permanent magnet 1b in the developing sleeve 1a has three each of N and S magnetic poles, which are alternately arranged, and the permanent magnet 6b of the toner layer thickness regulating member 6 has two magnetic poles $S_{61}$ and $S_{62}$. In this case, the two magnets are arranged so that the magnetic poles of the opposing portions of the two magnets have different polarities, i.e., a magnetic pole $N_{11}$ of the permanent magnet 1b in the developing sleeve 1a is arranged at a position adjacent to and facing the magnetic pole $S_{61}$ of the permanent magnet 6b in the toner layer thickness regulating member 6a, as shown in FIG. 10.

In this embodiment, in order to realize an arrangement wherein the magnetic flux density of a magnetic field formed between the magnetic pole ($N_{11}$) in the permanent magnet 1b located at substantially the facing position between the developing sleeve 1a and the toner layer thickness regulating member 6a, and the magnetic pole ($S_{61}$) in the permanent magnet 6b arranged at a position adjacent to and substantially facing the magnetic pole $N_{11}$ changes to become higher from the developing sleeve 1a side toward the toner layer thickness regulating member 6a side, the ratio of the 50% values of these magnetic poles is preferably set to satisfy:

(50% value of magnetic pole $S_{61}$)/(50% value of magnetic pole $N_{11}$)$\leq 1.0$ (More preferably, (50% value of magnetic pole $S_{61}$)/(50% value of magnetic pole $N_{11}$)$\leq 0.8$)

More specifically, in this embodiment, this ratio was set to satisfy a relation given below, thereby realizing the arrangement in which the magnetic flux density of the magnetic field formed between the magnetic poles $S_{61}$ and $N_{11}$ changed to become higher from the developing sleeve 1a side toward the toner layer thickness regulating member 6a side:

(50% value of magnetic pole $S_{61}$)/(50% value of magnetic pole $N_{11}$)$\equiv 0.8$ In this embodiment, the maximum value of the magnetic flux density of the magnetic pole $N_{11}$ was set to be 900 Gs, and that of the magnetic pole $S_{61}$ was set to be 800 Gs.

In addition, a distance W between the developing sleeve 1a and the toner layer thickness regulating member 6a was set to fall within a range from 100 µm to 2 mm, and the ratio between the absolute value of the peripheral velocity of the developing sleeve 1a and that of the toner layer thickness regulating member 6a was set to satisfy:

(Absolute value of peripheral velocity of toner layer thickness regulating member 6a)/(absolute value of peripheral velocity of developing sleeve 1a)>0.5

The weight-average particle size of a magnetic toner particle was set to be 5 µm or more, and a normal magnetic carrier having a weight-average particle size of 20 to 100 µm was used as the magnetic particles.

Furthermore, the sizes of the magnetic pole ($N_{11}$ in this embodiment) of the permanent magnet 1b at the facing position between the developing sleeve 1a and the toner layer thickness regulating member 6a and the magnetic pole ($S_{61}$ in this embodiment in the permanent magnet 6b) were set so that the width of the magnetic pole $S_{61}$ was smaller than that of the magnetic pole $N_{11}$, thereby realizing the arrangement in which the magnetic flux density of the magnetic field formed between the magnetic poles $S_{61}$ and $N_{11}$ changed to become higher from the developing sleeve 1a side toward the toner layer thickness regulating member 6a side.

In the developing device 20 with the arrangement shown in FIG. 10, since the magnetic flux density becomes higher from the developing sleeve 1a toward the toner layer thickness regulating member 6a, a magnetic force from the developing sleeve 1a toward the magnetic layer thickness regulating member 6a side acts on the magnetic particles present between the developing sleeve 1a and the toner layer thickness regulating member 6a. As a result, a brush of the magnetic particles is formed along the magnetic field between the magnetic poles $N_{11}$ and $S_{61}$.

The non-magnetic toner particles are charged by friction between the magnetic particles and the surface of the developing sleeve 1a, become attached to the magnetic particles and the developing sleeve 1a due to a reflection force, and are conveyed along the developing sleeve 1a. However, since the magnetic particles are returned from the facing position between the developing sleeve 1a and the toner layer thickness regulating member 6a into the developing container 3 for the above-mentioned reason, only sufficiently charged non-magnetic toner particles attached to the surface of the developing sleeve 1a can pass through the brush of the magnetic particles.

Since the toner layer thickness regulating member 6a is rotated in the same direction of the arrow a in FIG. 10 as the rotational direction of the developing sleeve 1a, (counter-clockwise) the magnetic particles held on the surface of the toner layer thickness regulating member 6a due to a magnetic force and some non-magnetic toner particles attached to the magnetic particles receive a convey force in the direction from the toner layer thickness regulating member 6a toward the interior of the developing container 3 due to a force of the magnetic field and a frictional force between themselves and the surface of the toner layer thickness regulating member 6a. Therefore, the magnetic particles will never be conveyed to a developing region beyond the facing position between the developing sleeve 1a and the toner layer thickness regulating member 6a.

In this embodiment, magnetic forces repel each other between the two adjacent magnetic poles $S_{61}$ and $S_{62}$ having the same polarities of the permanent magnet 6b, no lines of magnetic force are connected between these magnetic poles, and the direction of the lines of magnetic force is directed outwardly from the surface of the toner layer thickness regulating member 6a. For this reason, the magnetic particles and the non-magnetic toner particles, which are conveyed along the surface of the toner layer thickness regulating member 6a, receive a magnetic force for scraping away these particles from the surface of the toner layer thickness regulating member 6a, between these two magnetic poles. Therefore, the magnetic particles and the non-magnetic toner particles which are present on the surface of the toner layer thickness regulating member 6a and have a weak convey force are scraped away from the surface of the toner layer thickness regulating member 6a by the magnetic force.

In other words, the magnetic particles and the non-magnetic toner particles can be scraped away from the toner layer thickness regulating member 6a without applying any pressure to them.

The magnetic particles returned into the developing container 3 in this manner are stirred by the convey member 4 together with the toner particles, and are conveyed again along the surface of the developing sleeve 1a to substantially the facing position between the magnetic poles $N_{11}$ and $S_{61}$. Then, the magnetic particles are conveyed to be returned from the position of the magnetic pole $S_{62}$ into the developing container 3. The circulation path of the magnetic particles in this case in the developing container is as indicated by an arrow c in FIG. 10.

More specifically, according to this arrangement, a non-magnetic toner layer can be uniformly coated on the developing sleeve to have a desired thickness without applying an excessively high pressure which may damage the toner, the magnetic particles, and the developing sleeve, and the circulation function of the magnetic particles can be improved without leaking the magnetic particles to the developing region. For this reason, the toner particles in the developing container can be sufficiently charged. In addition, since the magnetic particles and non-magnetic toner particles conveyed on the surface of the toner layer thickness regulating member 6a are scraped away in a non-contact manner, deterioration of the magnetic particles and non-magnetic toner particles, and adhesion of the non-magnetic toner particles to the toner layer thickness regulating member 6a can be prevented. As a result, a properly developed image can be obtained even after use for a long period of time.

Ninth Embodiment

The ninth embodiment of a developing device for an image forming apparatus according to the present invention will be described below with reference to FIG. 11.

Figure 11:
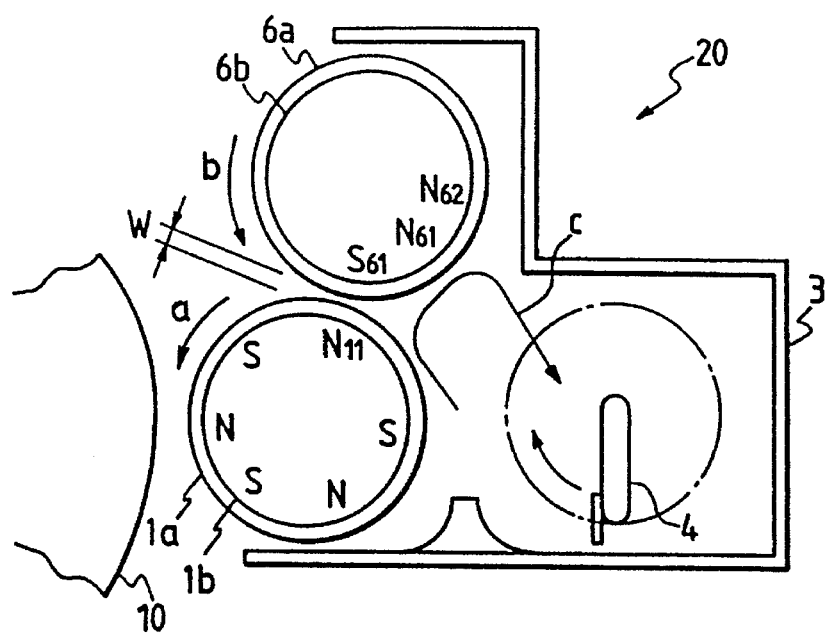

Referring to FIG. 11, a developing device 20 comprises a developing sleeve 1a as a toner carrier which faces a photosensitive drum 10 as an electrostatic latent image carrier, is arranged at the opening portion of a developing container 3 to be rotatable in the direction of an arrow a in FIG. 11, and consists of a non-magnetic metal member, and a permanent magnet 1b as first magnetic field generation means arranged in the developing sleeve 1a. The developing container 3 stores a magnetic toner, and a convey member 4 for conveying the magnetic toner in the direction of the developing sleeve 1a is arranged in the container 3. A cylindrical toner layer thickness regulating member 6a consisting of a non-magnetic metal member is arranged in the very vicinity of the developing sleeve 1a in the developing container 3, and a permanent magnet 6b as second magnetic field generation means is inserted in the toner layer thickness regulating member 6a. The toner layer thickness regulating member 6a is arranged at the upstream side, in the rotational direction of the developing sleeve 1a, of a developing region, and the rotational direction (arrow b) of the toner layer thickness regulating member 6a is the same as that (arrow a) of the developing sleeve 1a (counterclockwise).

Note that the permanent magnet 1b in the developing sleeve 1a has three each of N and S magnetic poles, which are alternately arranged, and the permanent magnet 6b of the toner layer thickness regulating member 6a has three magnetic poles $S_{61}$, $N_{61}$, and $N_{62}$.

In this embodiment, in order to realize an arrangement wherein the magnetic flux density of a magnetic field formed between the magnetic pole ($N_{11}$) in the permanent magnet 1b located at substantially the facing position between the developing sleeve 1a and the toner layer thickness regulating member 6a, and the magnetic pole ($S_{61}$) in the permanent magnet 6b arranged at a position adjacent to and substantially facing the magnetic pole $N_{11}$ changes to become higher from the developing sleeve 1a side toward the toner layer thickness regulating member 6a side, the ratio of the 50% values of these magnetic poles is preferably set to satisfy:

(50% value of magnetic pole $S_{61}$)/(50% value of magnetic pole $N_{11}$)≦1.0

(More preferably, (50% value of magnetic pole $S_{61}$)/(50% value of magnetic pole $N_{11}$)≦0.8)

More specifically, in this embodiment, this ratio was set to satisfy a relation below, thereby realizing the arrangement in which the magnetic flux density of the magnetic field formed between the magnetic poles $S_{61}$ and $N_{11}$ changed to become higher from the developing sleeve 1a side toward the toner layer thickness regulating member 6a side:

(50% value of magnetic pole $S_{61}$)/(50% value of magnetic pole $N_{11}$)≅0.8

In this embodiment, the maximum value of the magnetic flux density of the magnetic pole $N_{11}$ was set to be 900 Gs, and that of the magnetic pole $S_{61}$ was set to be 800 Gs.

In addition, a distance W between the developing sleeve 1a and the toner layer thickness regulating member 6a was set to fall within a range from 100 μm to 2 mm, and the ratio between the absolute value of the peripheral velocity of the developing sleeve 1a and that of the toner layer thickness regulating member 6a was set to satisfy:

(Absolute value of peripheral velocity of toner layer thickness regulating member 6a)/(absolute value of peripheral velocity of developing sleeve 1a)>0.5

The weight-average particle size of a magnetic toner particle was set to be 5 μm or more, and a normal magnetic carrier having a weight-average particle size of 20 to 100 μm was used as the magnetic particles.

In the developing device 20 with the arrangement shown in FIG. 11, in the permanent magnet 6b, lines of magnetic force are connected between the magnetic pole $S_{61}$ at the facing position, and the magnetic pole $N_{61}$ at the downstream side in the rotational direction of the toner layer thickness regulating member 6a. The magnetic particles attracted toward the toner layer thickness regulating member 6a side by a magnetic force at the facing position, and some non-magnetic toner particles attached to the magnetic particles are conveyed along the surface of the toner layer thickness regulating member 6a, as indicated by an arrow c in FIG. 11. As a result, insufficiently charged magnetic toner particles can be more reliably removed from the toner layer thickness regulating member 6a.

Since the two magnetic poles $N_{61}$ and $N_{62}$ having the same polarity are arranged at the downstream side in the rotational direction of the toner layer thickness regulating member 6a with respect to the magnetic pole $S_{61}$, some non-magnetic toner particles attached to the toner layer thickness regulating member 6a can be scraped away without applying any pressure to them.

Therefore, in the developing device with the arrangement shown in FIG. 11, the magnetic particles and some non-magnetic toner particles attached to the magnetic particles can be scraped away in a non-contact manner.

Tenth Embodiment

The tenth embodiment of a developing device for an image forming apparatus according to the present invention will be described below with reference to FIG. 12.

Figure 12:
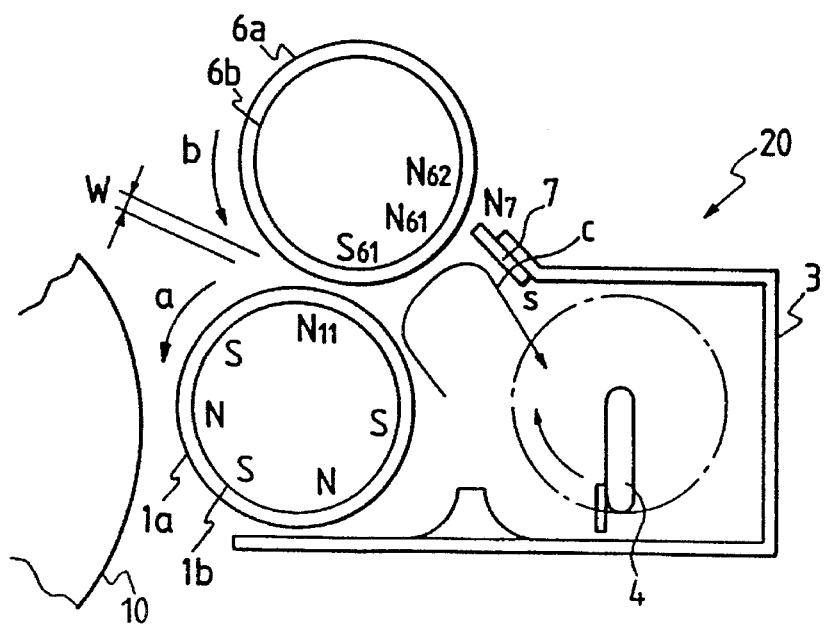

Referring to FIG. 12, a developing device 20 comprises a developing sleeve 1a as a toner carrier which faces a photosensitive drum 10 as an electrostatic latent image carrier, is arranged at the opening portion of a developing container 3 to be rotatable in the direction of an arrow a in FIG. 12, and consists of a non-magnetic metal member, and a permanent magnet 1b as first magnetic field generation means arranged in the developing sleeve 1a. The developing container 3 stores a magnetic toner, and a convey member 4 for conveying the magnetic toner in the direction of the developing sleeve 1a is arranged in the container 3. A cylindrical toner layer thickness regulating member 6a consisting of a non-magnetic metal member is arranged in the very vicinity of the developing sleeve 1a in the developing container 3, and a permanent magnet 6b as second magnetic field generation means is inserted in the toner layer thickness regulating member 6a. The toner layer thickness regulating member 6a is arranged at the upstream side, in the rotational direction of the developing sleeve 1a, of a developing region, and the rotational direction (arrow b) of the toner layer thickness regulating member 6a is the same as that (arrow a) of the developing sleeve 1a (counterclockwise). Furthermore, a planar permanent magnet 7 as third magnetic field generation means extending from the interior of the developing container 3 toward the toner layer thickness regulating member 6a is fixed to an end portion of the developing container 3 facing the toner layer thickness regulating member 6a.

Note that the permanent magnet 1b in the developing sleeve 1a has three each of N and S magnetic poles, which are alternately arranged, and the permanent magnet 6b of the toner layer thickness regulating member 6 has three magnetic poles $S_{61}$, $N_{61}$, and $N_{62}$. The planar permanent magnet 7 has a magnetic pole $N_7$ at a position facing the magnetic poles $N_{61}$ and $N_{62}$, which has the same polarity as that of these magnetic poles.

The weight-average particle size of a magnetic toner particle was set to be 5 μm or more, and a normal magnetic carrier having a weight-average particle size of 20 to 100 μm was used as the magnetic particles.

In this invention, in order to realize an arrangement wherein the magnetic flux density of a magnetic field formed between the magnetic pole ($N_{11}$) in the permanent magnet 1b located at substantially the facing position between the developing sleeve 1a and the toner layer thickness regulating member 6a, and the magnetic pole ($S_{61}$) in the permanent magnet 6b arranged at a position adjacent to and substantially facing the magnetic pole $N_{11}$ changes to become higher from the developing sleeve 1a side toward the toner layer thickness regulating member 6a side, the ratio of the 50% values of these magnetic poles is preferably set to satisfy:

(50% value of magnetic pole $S_{61}$)/(50% value of magnetic pole $N_{11}$)≦1.0

(More preferably, (50% value of magnetic pole $S_{61}$)/(50% value of magnetic pole $N_{11}$)≦0.8)

More specifically, in this embodiment, this ratio was set to satisfy a relation below, thereby realizing the arrangement in which the magnetic flux density of the magnetic field formed between the magnetic poles $S_{61}$ and $N_{11}$ changed to become higher from the developing sleeve 1a side toward the toner layer thickness regulating member 6a side:

(50% value of magnetic pole $S_{61}$)/(50% value of magnetic pole $N_{11}$)≅0.8

In this embodiment, the maximum value of the magnetic flux density of the magnetic pole $N_{11}$ was set to be 900 Gs, and that of the magnetic pole $S_{61}$ was set to be 800 Gs.

In addition, a distance W between the developing sleeve 1a and the toner layer thickness regulating member 6a was set to fall within a range from 100 μm to 2 mm, and the ratio between the absolute value of the peripheral velocity of the developing sleeve 1a and that of the toner layer thickness regulating member 6a was set to satisfy:

(Absolute value of peripheral velocity of toner layer thickness regulating member 6a)/(absolute value of peripheral velocity of developing sleeve 1a)>0.5

In the developing device with the arrangement shown in FIG. 12, lines of magnetic force are connected between the magnetic poles $S_{61}$ and $N_{61}$ of the permanent magnet 6b of the toner layer thickness regulating member 6a, and a convey force in the direction toward the interior of the developing container 3 acts on the magnetic particles between these two poles.

The magnetic particles which form a brush by using the magnetic field between the magnetic poles $N_{11}$ and $S_{61}$ receive a convey force by using the magnetic force of the magnetic poles $S_{61}$ and $N_{61}$ indicated by an arrow c in FIG. 12 in addition to the magnetic force between the magnetic poles $N_{11}$ and $S_{61}$ and the frictional force between themselves and the surface of the toner layer thickness regulating member 6a as in the first embodiment, and are conveyed into the developing container 3. The magnetic particles conveyed along the surface of the toner layer thickness regulating member 6a acquire a strong magnetic repulsion force from the magnetic poles $N_{61}$, $N_{61}$, and $N_7$, and even when a developing agent has a high agglomeration property, the magnetic particles and non-magnetic toner particles can be scraped away in a non-contact manner.

The preferred embodiments of the present invention have been described. However, the present invention is not limited to these embodiments, and various changes and modifications may be made within the technical scope of the invention.

What is claimed is:

1. A developing device comprising:

a developing agent container for storing a developing agent including toner particles and magnetic carrier particles;

a toner carrier for carrying and conveying toner particles to supply the toner particles to an image carrier for carrying an electrostatic image;

a first magnetic pole fixed within said toner carrier and having a polarity;

a developing agent regulating rotary member disposed adjacent said toner carrier and forming a gap therebetween; and a second magnetic pole fixed within said developing agent regulating rotary member and facing said first magnetic pole, said second magnetic pole having a polarity different from the polarity of said first magnetic pole, wherein a brush of carrier magnetic particles is formed between said toner carrier and said developing agent regulatory rotary member by a magnetic force generated between said first magnetic pole and said second magnetic pole, and said regulating rotary member allows only toner particles to pass through the gap without substantially allowing passage of the magnetic carrier particles through the gap.

2. A device according to claim 1, wherein said regulating rotary member moves in a direction opposite to said toner carrier at a developing agent regulating portion.

3. A device according to claim 1, wherein a magnetic flux density increases from said toner carrier toward said regulating rotary member at a developing agent regulating portion.

4. A device according to claim 1, wherein said regulating rotary member has a third magnetic pole at a downstream side, in a rotational direction of said regulating rotary member, of said second magnetic pole.

5. A device according to claim 1, wherein said toner is a non-magnetic toner.

6. A device according to claim 1, wherein said toner is a magnetic toner.

* * * * *

UNITED STATES PATENT AND TRADEMARK OFFICE
CERTIFICATE OF CORRECTION

PATENT NO. : 5,523,533  
DATED : June 4, 1996  
INVENTOR(S) : Isami ITOH, et al.

Page 1 of 3

It is certified that error appears in the above-indentified patent and that said Letters Patent is hereby corrected as shown below: On the title page,

ITEM [56] - REFERENCES CITED - FOREIGN PATENT DOCUMENTS:

"4324748" should read --43-24748--.

COLUMN 1:

Line 40, "a portion A" should be deleted.

COLUMN 2:

Line 53, "does" should read --do--.

COLUMN 3:

Line 38, "are" should read --is--.

COLUMN 4:

Line 28, "an" should be deleted; and,
Line 41, "are pointed out." should read --arise.--.

COLUMN 7:

Line 34, "arranged," should read --arranged--; and,
Line 61, "1a," should read --1a--.

COLUMN 9:

Line 24, "end" should read --and--.

UNITED STATES PATENT AND TRADEMARK OFFICE
CERTIFICATE OF CORRECTION

PATENT NO. : 5,523,533
DATED : June 4, 1996
INVENTOR(S) : Isami ITOH, et al.

It is certified that error appears in the above-indentified patent and that said Letters Patent is hereby corrected as shown below:

COLUMN 11:

Line 52, "arrangement," should read --arrangement--.

COLUMN 13:

Line 35, "a" should read --the--.

COLUMN 15:

Line 25, "1a," should read --1a--; and,
Line 36, "clockwise)" should read --clockwise),--.

UNITED STATES PATENT AND TRADEMARK OFFICE
CERTIFICATE OF CORRECTION

PATENT NO. : 5,523,533
DATED : June 4, 1996
INVENTOR(S) : Isami ITOH, et al.

It is certified that error appears in the above-indentified patent and that said Letters Patent is hereby corrected as shown below:

COLUMN 19:

Line 24, "poles $N_{61.}N_{61.}$" should read --poles $N_{61}, N_{61}$, --.

COLUMN 20:

Line 15, "regulatory" should read --regulating--.

Signed and Sealed this

Twenty-ninth Day of October 1996

Attest:

BRUCE LEHMAN

Attesting Officer

Commissioner of Patents and Trademarks